Dec. 26, 1933.   R. F. PEO   1,940,694
METHOD OF MAKING PISTONS FOR SHOCK ABSORBERS
Filed March 11, 1930   2 Sheets-Sheet 1

Inventor
Ralph F. Peo
By Popper Powers
Attorneys

Dec. 26, 1933.    R. F. PEO    1,940,694
METHOD OF MAKING PISTONS FOR SHOCK ABSORBERS
Filed March 11, 1930    2 Sheets-Sheet 2
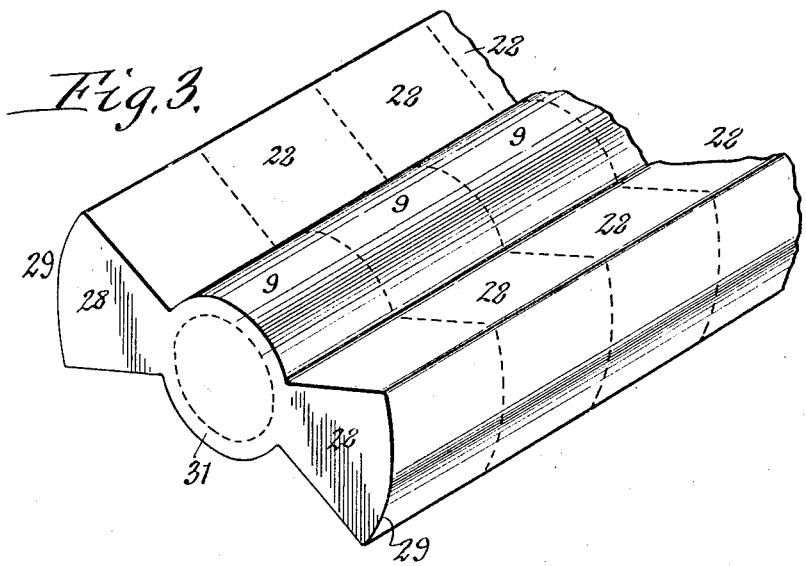
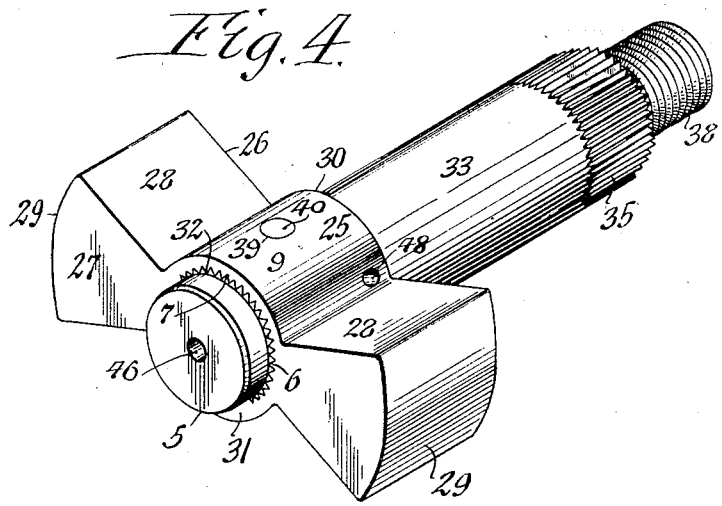
Inventor
Ralph F. Peo
By Pope & Powers
Attorneys Patented Dec. 26, 1933

1,940,694

UNITED STATES PATENT OFFICE 1,940,694

METHOD OF MAKING PISTONS FOR SHOCK ABSORBERS

Ralph F. Peo, Kenmore, N. Y., assignor to Houde Engineering Corporation, Buffalo, N. Y., a corporation of New York Application March 11, 1930. Serial No. 434,967

1 Claim. (Cl. 29—156.5)

This invention relates to an improved method of making the oscillating pistons and rock shafts of hydraulic shock absorbers, and more particularly the double wing pistons and the shafts of Houdaille type shock absorbers.

Heretofore the piston wings and the shaft of such absorbers have been forged from one piece of alloy steel which forging was heat treated before it was machined in order to obtain the maximum strength and the greatest possible strength and still not impair to any appreciable extent the machinibility of the same. Owing to the awkward shape of the integral shaft and piston wings the same has presented a difficult subject for manufacture on any where near an economical basis. A careful study of the complete assembly of shock absorbers of this type as heretofore made discloses that the short sweep of the peripheral walls of the working chambers must be absolutely concentric with the axis of the shaft and the side walls of these chambers must be parallel and in planes at right angles to the center line of the shaft.

The counter bore in the rear wall of the working chamber must also be concentric, round and axially in line with the shaft, and it is also necessary to maintain this counter bore in the rear wall at a definite depth in order to permit the use of a hub or central connection between two piston wings or vanes and still have this central connection or hub clear this counter bore. Due to the necessity of keeping the front sides of the piston wings or vanes square with the axis of the shaft resort was had to an expensive method of grinding this side or face of the piston wings or vanes by locating the same in a rotating type of machine which permitted grinding this one piece shaft and piston wings on centers and finishing the front face of the piston wings by using the side of a grinding wheel.

Inasmuch as the rear faces of the piston wings or vanes must be parallel with the front faces of the same as well as square with the center line of the shaft it has been necessary to grind this part by locating the same on the front face of the object, which operation although efficient and accurate, was awkward because the shaft section is an integral part of the piston wings and prevents the use of simple fixtures and holding devices.

These several operations are very expensive and involve a loss wholly out of proportion to present-day manufacturing methods.

It is therefore the object of this invention to provide a method of manufacturing the piston wings or vanes and shaft and assembling the same in a manner which is simple and economical and permits of producing a shock absorber operating with superior efficiency.

In the accompanying drawings:

Figure 3 is a perspective view of a rolled metal bar from which piston blanks are cut in accordance with my invention.

Figure 4 is a similar view showing the finished and assembled piston and operating rock shaft.

In the following description similar characters of reference indicate like parts in the several figures of the drawings.

Figure 1:
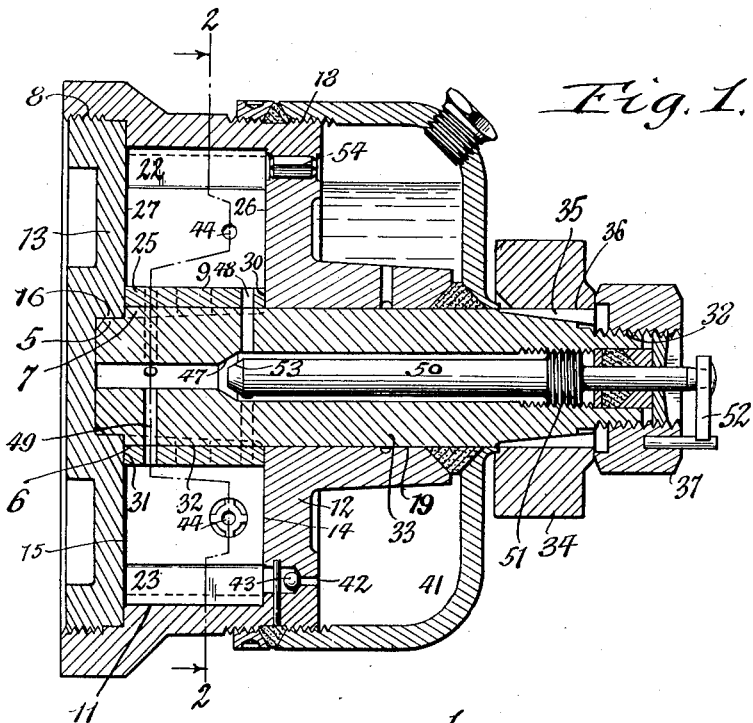
Figure 1 is a vertical longitudinal section of a hydraulic shock absorber made in accordance with my invention.

Although the specific construction of the shock absorber which embodies the piston and shaft constructed in accordance with my invention may be variously organized the accompanying drawings show one form of its adaptation which is as follows:—

The body of this shock absorber comprises a peripheral wall 10 having a cylindrical inner face 11, and front and rear transverse heads or walls 12, 13 arranged at the front and rear ends of the peripheral wall and provided on their opposing inner sides with front and rear faces 14, 15 which are arranged at right angles or square to the axis of the inner face of the peripheral wall. The rear wall 13 is preferably made separate from the peripheral wall 10 and connected therewith by a screw joint 8 and provided centrally on its inner side with a cylindrical recess 16 which forms a closed rear bearing for a purpose which will presently appear. On opposite sides of the peripheral and rear walls of the body the same are provided with lugs 17 whereby the absorber is connected with the body or frame of an automobile which is to be cushioned. The front wall 12 of the body is preferably made integral with the peripheral wall 10 and on its central part this front wall is provided with a forwardly projecting front bearing 19 which is axially in line with the rear bearing 16.

The interior of the body is divided into two semi-cylindrical working chambers 20, 21 by means which preferably comprise a partition having upper and lower sections 22, 23 arranged within the body on diametrically opposite sides of the axis of the same and having their opposing inner ends separated from each other and constructed to form parts 24 of a cylindrical bearing surface.

Within the body of the absorber is arranged an oscillating piston which in its preferred form comprises a central hub 25 which has its axis arranged in line with the axis of the front and rear bearings 19, 16 and engages its periphery 9 with the bearing surfaces 24 on the partition sections, and engages its front and rear ends 30, 31 with the inner faces of the front and rear body walls or heads, and two wings or vanes 28 extending radially from diametrically opposite sides of the hub 25 and each having a peripheral outer face 29 curved concentrically with the axis of the hub, and front and rear radial side faces 26, 27 arranged at right angles to the axis of the hub and in line with the front and rear ends 30, 31, respectively, of the hub, and engaging with the inner faces 26, 27 of the front and rear body walls.

In the central part of the hub of the piston the same is provided with a cylindrical opening 32 extending axially therethrough from the front end to the rear end thereof.

The numeral 33 represents a rock shaft provided at its front end with a rock arm 34 which is preferably attached thereto by an annular row of longitudinal serrations 35 formed on the periphery of the rock shaft adjacent to its front end and engaging with a similarly serrated opening 36 in the rock arm 34, and a screw clamping nut 37 applied to a screw thread 38 on the front end of the shaft and pressing rearwardly against the front side of the rock arm. The latter is adapted to be connected in any suitable manner an axle of the car or other available part which moves relatively to the body or frame of the car as the latter runs over uneven roads.

The shaft adjacent to its rear end passes through the central opening in the hub of the piston and is secured thereto so that a short stub portion 5 thereof projects from the rear side of the piston hub and a comparatively long arbor portion projects forwardly from the front side of the piston hub. The rear stub portion of the shaft is journaled in the rear bearing 16 of the body and the front arbor portion of the same is journaled in the front bearing 19 thereof, thereby providing a support for the piston on opposite ends of its axis which ensures maintaining the piston in alinement with the axis of the shaft and prevents the same from twisting out of place and bearing unevenly on the co-operating peripheral and side surfaces of the working chamber so that even wear of the parts and maximum efficiency in the operation of the absorber are obtained. The piston may be secured to the shaft in any suitable manner but preferably by means which include an annular row of longitudinal serrations 7 formed on that part of the shaft which crosses the interior of the hollow body and engaging with longitudinal serrations 6 in the bore 31 of the piston hub. The latter is further provided with one or more radial openings 39 containing connecting plugs 40, each of the latter being connected with its sides to the wall of the respective radial opening 39 and with its inner end to the adjacent part of the periphery of the rock shaft by fusing together the material of the shaft, piston, hub and connecting plugs. In actual practice it has been found satisfactory to make the shaft and piston of hard alloy steel and the connecting plugs of soft steel and to utilize an electric welding process for fusing or welding said shaft, piston and plugs together so that the same form practically an integral structure and are incapable of separation.

The working chambers are filled with a resistance liquid, such as oil and this is supplied as required from a replenishing chamber or reservoir 41 mounted on the front side of the body containing the working chambers. The resistance liquid is adapted to flow from the lower end of the replenishing chamber and into the lower end of one or both working chambers through one or more replenishing ports 42 formed in the lower part of the wall 12 and each containing a check valve 43 which prevents return flow of replenishing liquid through these lower ports from the working chambers into the replenishing chamber.

Figure 2:
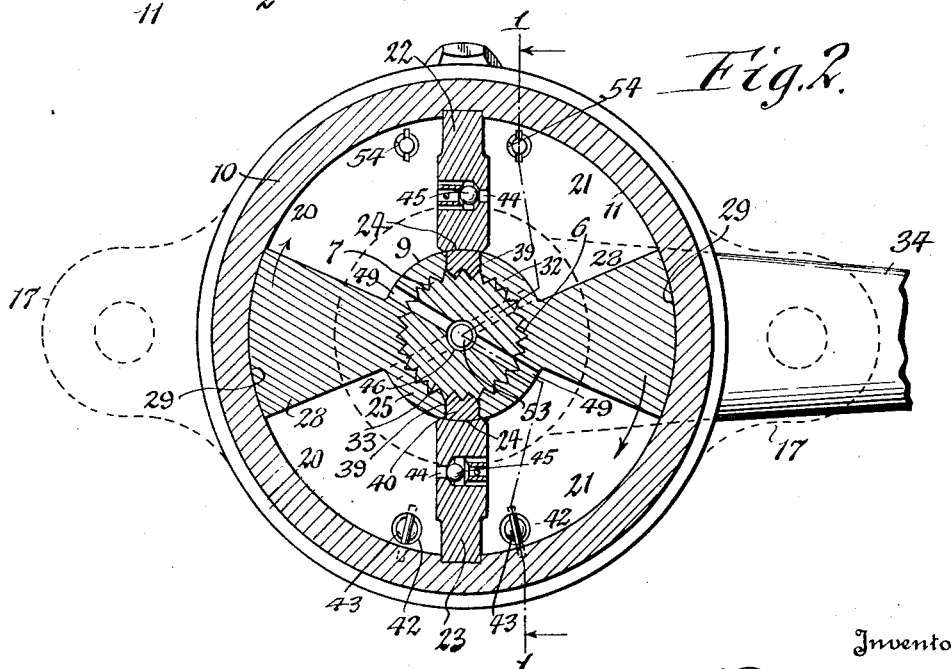
Figure 2 is a vertical transverse section of the same taken on line 2—2 Fig. 1.

During the low pressure strokes of the piston wings in the working chambers resistance liquid is free to by-pass from the low pressure end of one working chamber to the high pressure end of the other working chamber by flowing through a by-pass port 44 in each partition section, but when the piston wings or vanes move in the opposite direction indicated by an arrow in connection with the piston wings in Fig. 2 for effecting a high pressure stroke, then the by-pass ports 44 are closed by check valves 45 and cause the liquid in the working chambers to offer a greater resistance.

The resistance which the liquid in the working chamber offers to the movement of the piston wings or vanes therein may be regulated to suit the load and other conditions under which the shock absorber works. This is preferably accomplished by providing the rock shaft with a longitudinal bore 46 having a valve seat 47 within the piston, regulating passages 48, 49 extending radially through the shaft and the piston hub and extending the bore 46 of the shaft to the periphery of the piston hub at points in front and in rear of said valve seat, and a valve stem 50 arranged in the bore of the rock shaft and having a screw connection 51 therewith so that upon turning the stem by means of a handle 52 at the front end thereof the valve 53 at the rear end of the same is moved either toward or from the valve seat 47, whereby the flow of liquid from one side of each piston wing to the other is regulated accordingly.

Air in the resistance liquid is permitted to escape from the working chambers to the replenishing chambers through vent ports or openings 54 extending through the front wall 12 of the body at the upper ends of the working chambers.

In the manufacture of this shock absorber the body is machined by first boring the cylindrical bearing 19 in the front wall or head 12 so that it forms a point for locating the tools whereby the inner face of the front wall 12 and the inner face of the peripheral wall 10 are accurately machined and are square with each other.

The rock shaft 33 is produced from a straight cylindrical rod of hot rolled alloy steel which is heat treated, then cut into lengths or blanks corresponding to that required for the absorber and then machined and ground to the size to provide the serrations and bearing surfaces thereon.

The piston is produced from a steel bar which has been rolled in a mill so that its contour or cross section corresponds practically to the cross sections of the hub and wings or vanes of the finished piston and requires little, if any, finishing to conform to the required shape, as shown in Fig. 3. This bar is cut in sections or blanks of the length required for making pistons each having a hub 25 and wings 28 on opposite sides of the hub. A true hole 32 is then bored lengthwise through the center of the hub which is adapted to receive the rock shaft 33 and the serrations are formed therein to receive the serrations of the shaft. This true central hole of the hub is utilized to locate both the end and side faces of the hub and wings and peripheral faces of the wings, which last-mentioned operations are performed on a grinding equipment of the simplest type and all located from the central hole 32 of the hub so that when the piston is finished the several machine surfaces are perfectly true and square relatively to one another.

After the piston is machined in the manner described the radial holes 39 for the reception of the fusible plugs 40 are formed therein.

The size of the shaft and the hole in the hub of the piston are such that the same can be assembled by a cold press fit of the shaft into the hole of the piston hub. The shaft and hub are assembled so that the shaft projects slightly beyond the rear side of the piston and forms a short rear stub and a long front arbor thereon. After such assemblage the plugs 40 are inserted in the holes 39 and the latter are electrically welded or fused at their sides to the hub of the piston and at their inner ends to the periphery of the shaft so as to render the shaft and piston virtually integral and incapable of moving one relative to the other while in use. Due to the area and volume of the plugs being small in comparison with the area and volume of the piston and shaft, the heat of the welding process is diffused quickly and does not injure the heat-treated properties of the working parts being joined.

After the shaft and piston have been thus fused together the regulating passages 48, 49 are drilled radially through the piston hub and the shaft.

When thus completed the pistons and shaft are in condition to be assembled with the working chambers of the body and the associated parts preparatory to mounting the shock absorber for use.

This invention effects a decided saving in cost of manufacture due to the simplicity of the operations without sacrificing any accuracy in the finished product and it also permits of easily and economically providing pivotal supports for the piston on opposite sides thereof.

I claim as my invention:

In the manufacture of a rotatable piston for hydraulic shock absorbers, said piston comprising a shaft and a pair of oppositely directed wings, the method which comprises the steps of drilling a true hole in the center of a blank having oppositely directed wings, machining and accurately grinding the arcuate surfaces of the wings with the true hole as a center for the operations, drilling a plurality of relatively small holes extending radially through a central portion of the blank to communicate with the true hole, cold pressing a round shaft of heat treated steel in the true hole, and plug welding the blank and the shaft through the radial holes.

RALPH F. PEO.